United States Patent
Manshanden

(10) Patent No.: US 9,850,876 B2
(45) Date of Patent: Dec. 26, 2017

(54) SHIP SCREW, PUMP SCREW OR TURBINE SCREW

(71) Applicant: G.A.M. Manshanden Management B.V., Medemblik (NL)

(72) Inventor: Gerardus Augustinus Maria Manshanden, Medemblik (NL)

(73) Assignee: G.A.M. Manshanden Management B.V., Medemblik (NL)

( * ) Notice: Subject to any disclaimer, the term of this patent is extended or adjusted under 35 U.S.C. 154(b) by 368 days.

(21) Appl. No.: 14/405,065

(22) PCT Filed: Jun. 5, 2013

(86) PCT No.: PCT/NL2013/050396
§ 371 (c)(1),
(2) Date: Dec. 2, 2014

(87) PCT Pub. No.: WO2013/183994
PCT Pub. Date: Dec. 12, 2013

(65) Prior Publication Data
US 2015/0159619 A1    Jun. 11, 2015

(30) Foreign Application Priority Data
Jun. 6, 2012 (NL) ..................................... 2008948

(51) Int. Cl.
*B63H 1/26*    (2006.01)
*F03B 3/04*    (2006.01)
*B63H 1/14*    (2006.01)
*B63H 1/16*    (2006.01)
(Continued)

(52) U.S. Cl.
CPC .............. *F03B 3/04* (2013.01); *B63H 1/14* (2013.01); *B63H 1/16* (2013.01); *B63H 1/26* (2013.01); *B63H 11/08* (2013.01); *A61M 1/101* (2013.01); *Y02E 10/28* (2013.01); *Y02E 10/38* (2013.01)

(58) Field of Classification Search
CPC ... B63H 1/14; B63H 1/16; B63H 1/26; B63H 5/14; B63H 2001/122; B63H 2001/125; B63H 2001/127; B63H 11/08; F03B 3/121; F03B 3/126; F04D 19/005; F04D 3/02
See application file for complete search history.

(56) References Cited

U.S. PATENT DOCUMENTS

| | | | |
|---|---|---|---|
| 4,838,819 A | 6/1989 | Todorovic | |
| 5,730,582 A | 3/1998 | Heitmann | |

(Continued)

FOREIGN PATENT DOCUMENTS

| | | |
|---|---|---|
| CA | 2215098 | 3/1999 |
| DE | 20304488 | 5/2003 |

(Continued)

*Primary Examiner* — Logan Kraft
*Assistant Examiner* — Sabbir Hasan
(74) *Attorney, Agent, or Firm* — Marcus C. Dawes

(57) ABSTRACT

A ship screw, pump screw or turbine screw for use under water or another liquid, comprising a front side and a rear side, wherein water or another liquid is forced from the front side to the rear side in use, and comprising a hub and at least two blades extending from said hub, wherein the blades are substantially helical/spiral shaped, their effective surface area increasing from the front side toward the rear side.

10 Claims, 3 Drawing Sheets

(51) Int. Cl.
*B63H 11/08* (2006.01)
*A61M 1/10* (2006.01)

(56) References Cited

U.S. PATENT DOCUMENTS

| | | | | |
|---|---|---|---|---|
| 5,964,626 A | * | 10/1999 | Varney | B63H 11/08 440/38 |
| 6,162,017 A | | 12/2000 | Raible | |
| 2003/0223874 A1 | | 12/2003 | Keeton | |
| 2004/0203298 A1 | | 10/2004 | Chaix | |
| 2008/0292478 A1 | | 11/2008 | Baykut | |

FOREIGN PATENT DOCUMENTS

| | | | | |
|---|---|---|---|---|
| EP | 2295808 | | 3/2011 | |
| EP | 2295808 A2 | * | 3/2011 | ............... F03B 3/10 |
| FR | 2927605 | | 8/2009 | |
| FR | 2927605 A1 | * | 8/2009 | .............. B63H 1/16 |
| GB | 228177 | | 7/1925 | |
| GB | 2044367 | | 10/1980 | |
| WO | WO-0138697 | | 5/2001 | |
| WO | WO-2011116231 | | 9/2011 | |

* cited by examiner

SHIP SCREW, PUMP SCREW OR TURBINE SCREW

The invention relates to a ship screw, pump screw or turbine screw for use under water, comprising a front side and a rear side, wherein water or another liquid is forced from the front side to the rear side in use, and comprising a hub and at least two blades extending from said hub.

Such screws are generally known. It is a known fact that screws are one of the causes of fish mortality. Furthermore, such screws produce a lot of noise caused by turbulence. In the processing of blood by means of a blood pump, for example, cavitation may be a problem.

The object of the invention is to provide a screw which is efficient and/or which causes less fish mortality and/or which produces less noise and/or which causes less cavitation.

In order to achieve that object, the blades are substantially helical/spiral shaped, their effective surface area increasing from the front side toward the rear side. Furthermore, the blades are preferably shaped so that fish are mostly guided along the hub without being touched by the blades.

Preferably, the blades taper off to a point in the outer circumference of the screw at the front side.

The part of the hub where the blades are mounted on the hub is preferably conical or frustoconical in shape.

The front ends of the blades preferably extend in front of the end of the hub.

Preferably, a tubular housing is provided round the blades.

In a first embodiment, the housing is attached to the blades, so that it rotates along with the blades.

In a second embodiment, the housing is stationary and the blades rotate within the housing.

The front side of the housing is preferably frustoconical in shape, with the wide part of the housing being directed toward the front side.

The cross-sectional area of the space through which the water is forced in use preferably decreases between the front side of the blades and the rear side of the blades.

In another preferred embodiment, stationary guide blades are mounted on a cylinder in the housing, behind the blades.

The guide blades are preferably slightly helically curved on the front side, such that, in use, the water being forced in a helix along the hub will flow along the guide blades, parallel thereto, at the front side of the guide blades and substantially straight to the rear at the rear side of the guide blades.

Preferably, a substantially frustoconical element is provided in the housing at the rear side of the guide blades, the narrow side of which element extends toward the rear.

In the preferred embodiment, the hub is connected to a drive shaft which is designed for being driven by the ship's engine, wherein the drive shaft extends transversely to the axis of rotation of the hub, and wherein the drive shaft extends through the wall of the cylinder near the guide blades, and wherein a transmission mechanism is disposed within the cylinder for transmitting the rotation of the drive shaft to the hub. The screw can also be used as a bow screw, a major advantage being the fact that it is low-noise.

Preferably, the effective surface area of the blades increases continuously from the front side to the place where they are mounted on the hub.

If the screw is intended for use in an underwater turbine, the crew is preferably symmetrical, such that the front side and the rear side are identical in shape. As a result, the turbine can profit from both directions of flow of tidal currents.

The invention will now be explained with reference to embodiments shown in the figures, in which.

Figure 1:
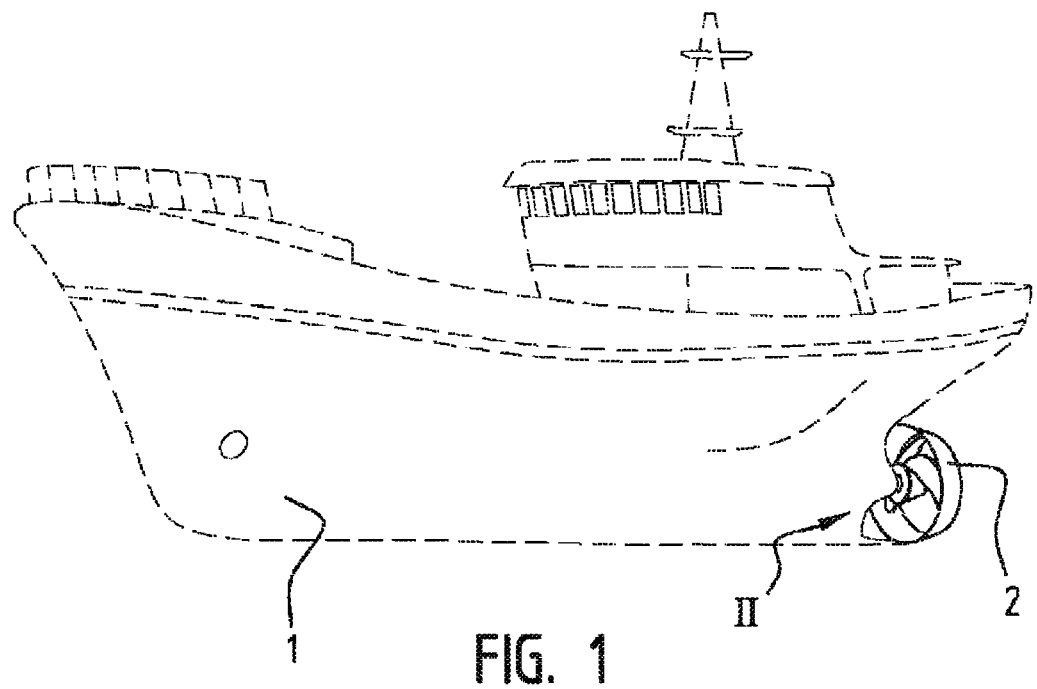
FIG. 1 is a perspective view of a ship fitted with a first embodiment of a ship screw according to the invention.
Figure 2:
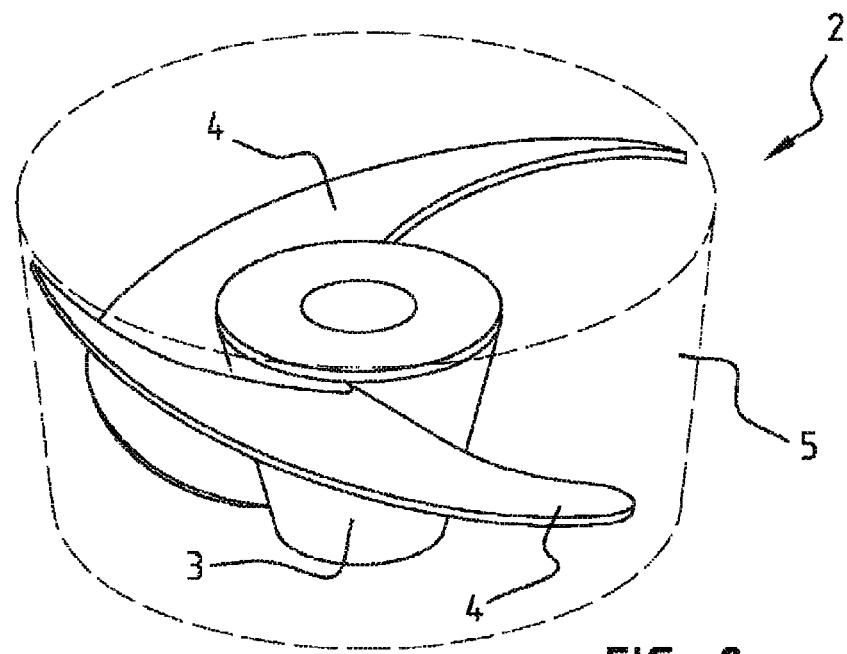
FIG. 2 is a perspective view of the ship screw of FIG. 1.

FIG. 1 shows a ship 1 with a ship screw 2 that is driven by the ship's engine via a drive shaft. As shown in FIG. 2, the ship screw 2 comprises a frustoconical hub 3 which can be mounted on the drive shaft, on which hub two blades 4 are mounted. A housing 5 is attached to the outer circumference of the two blades 4. Alternatively, the housing 5 may be fixed to the ship 1, so that the housing 5 will not rotate along with the blades 4. The housing 5 is frustoconical in shape, so that the cross-sectional area through which the water is forced from the front to the rear decreases.

The blades 4 extend from the hub 3 in the direction of the outer circumference and the front side of the ship screw 2 in a combined helical/spiral shape. The front side of the ship screw 2 is therefore formed by the front sides of the blades 4, which taper off to a point. The effective area of the blades 4, at least the front part thereof, becomes larger and larger, seen in the direction of the rear side of the ship screw 2.

Figure 3:
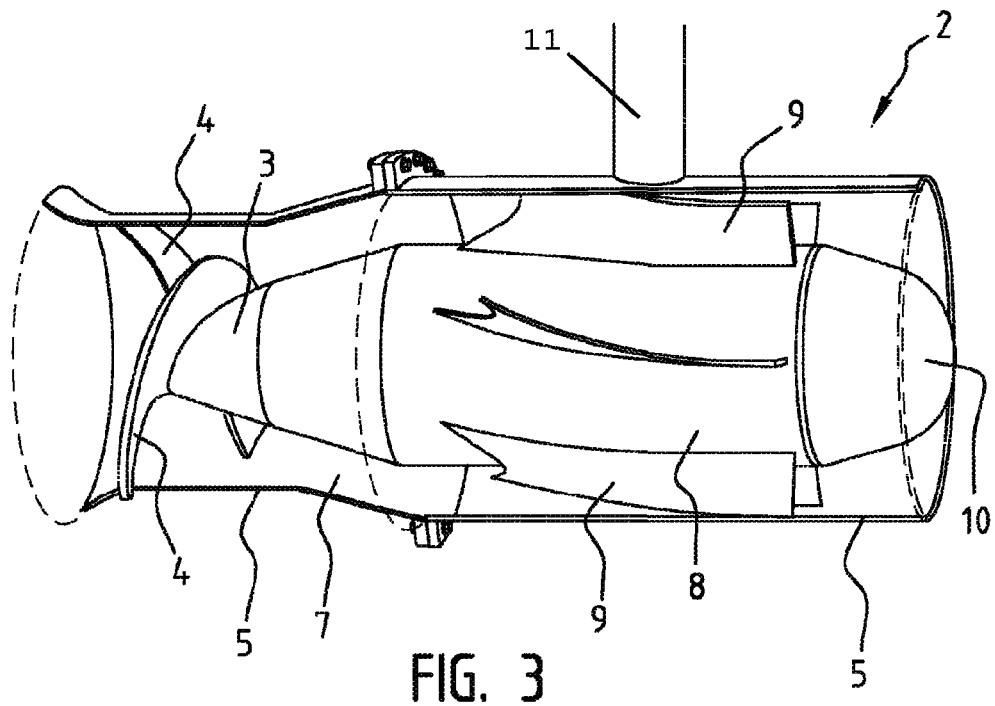
FIG. 3 is a perspective view of a second embodiment of a ship screw according to the invention.

According to an alternative embodiment as shown in FIG. 3, in which the housing 5 is stationary, the front end of the housing 5 is frustoconical in shape, but the part where the blades 4 extend is cylindrical in shape. Located behind the blades is a frustoconical flow-through opening 7, after which frustoconical part a cylindrical part of the housing is connected, in which part a cylinder 8 provided with guide blades 9 is present. The front sides of the guide blades 9 are slightly helically curved, such that the water being forced along the hub 3 in a helix flows along the guide blades 9, parallel thereto, at the front side of the guide blades 9 and straight rearward out of the housing 5 at the rear side of the guide blades 9. A largely frustoconical part 10 is mounted to the rear side of the cylinder 8 so as to prevent the occurrence of a vacuum in the outflow. The drive shaft 11 between the hub 3 and the ship's engine extends through the wall of the cylinder 8, with a 90 degree transmission providing the connection (for example via conical gears) in the cylinder 8.

Figure 4:
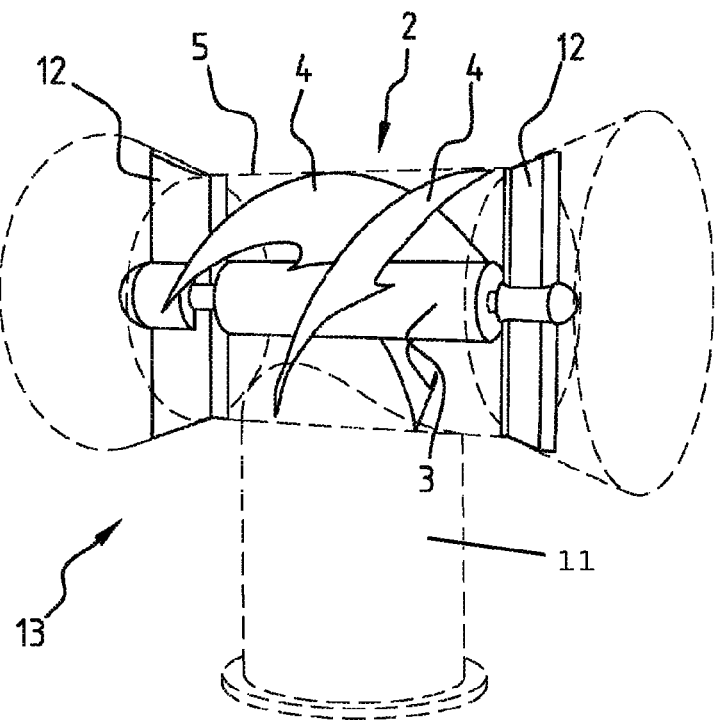
FIG. 4 is a perspective view of a turbine with a screw for use under water.
Figure 5:
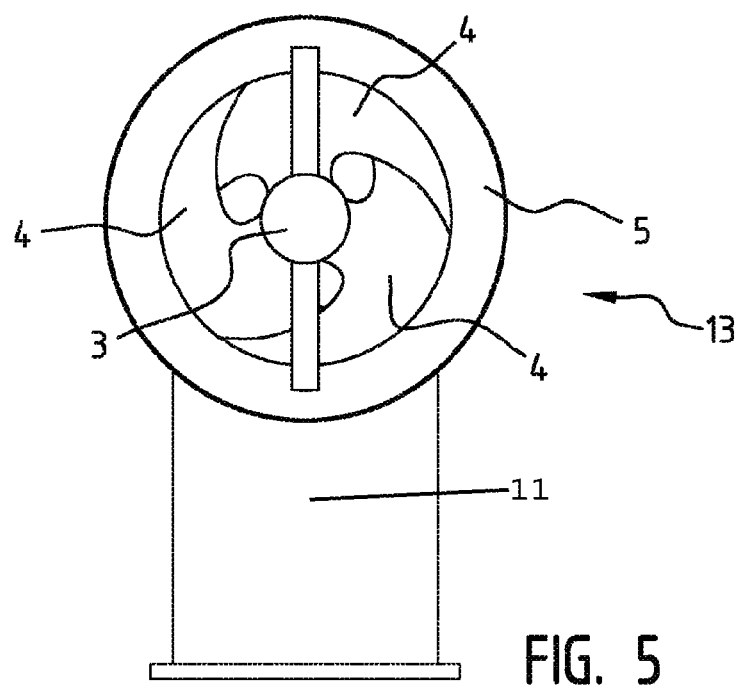
FIG. 5 is a front view of the turbine with the screw shown in FIG. 4.
Figure 6:
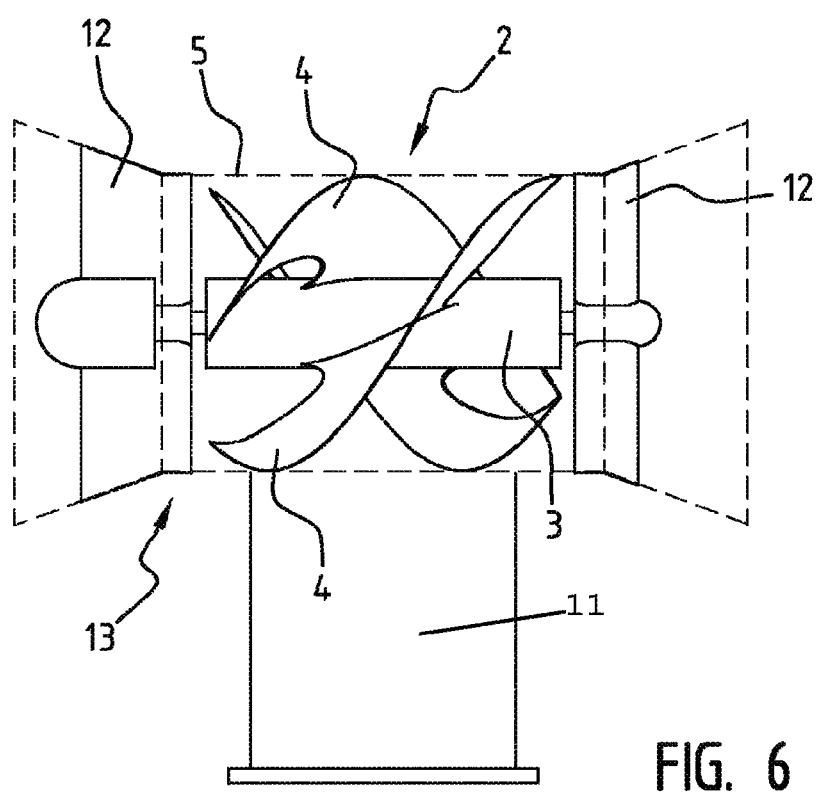
FIG. 6 is a side view of the turbine with the screw shown in FIG. 4.

FIGS. 3, 4 and 5 show a turbine 13 intended for placement under water in the sea, such that electricity can be generated by tidal currents. The screw 2 comprises a hub 3, on which three blades 4 are mounted. The hub 3 with the three blades 4 is mounted in a stationary housing 5, being mounted on bearings, via a shaft 11, in support beams 12 at the front/rear side. The housing 5 tapers off to a trumpet shape at the front/rear side. The screw 2 is symmetrical, such that the front side and the rear side of the screw 2 are identical in shape.

The blades 4 extend from the hub 3 in the direction of the outer circumference and the front side/rear side of the screw 2 in a combined helical/spiral shape. The front side/rear side of the screw 2 is therefore formed by the front sides of the blades 4, which taper off to a point. The effective area of the blades 4 becomes larger and larger in the direction of the plane of symmetry of the screw 2.

The invention has thus been described on the basis of preferred embodiments. It should be understood, however, that the present description is primarily illustrative. Various details of the structure and function have been presented, but modifications which are made thereto, and which are fully extended by the general meaning of the terminology in which the appended claims are worded, are to be considered to fall within the principle of the present invention. The description and the drawings are to be used to interpret the claims. The claims must not be interpreted in such a manner that the scope of the protection being sought is to be regarded as being defined by the strict, literal meaning of the words used in the claims, the description and the drawings only serving to put an end to any ambiguity that may be found in the claims. To determine the scope of the protection being sought through the claims, each and any element that is equivalent to an element specified therein must be suitably considered.

The invention claimed is:

1. A ship provided with an engine and a ship screw for use under water, the water comprising fish, wherein the screw comprises:
   a front side and a rear side, wherein water is forced from the front side to the rear side in use, and
   a hub and at least two blades extending from said hub, wherein a tubular housing is provided around the blades,
   wherein the blades are substantially helical/spiral shaped,
   wherein the blades extend from the hub in the direction of the outer circumference and the front side of the screw in a helical shape,
   wherein the blades taper off to a point in the outer circumference of the screw at the front side, the blades having an effective surface area increasing from the front side toward the rear side,
   wherein the tubular housing has an open front side that is configured to allow the water comprising the fish to freely enter the tubular housing and an open rear side that is configured to allow the water comprising the fish to freely exit the tubular housing, and
   wherein the blades extend in a continuous manner from the front side of the tubular housing to the rear side of the tubular housing.

2. A screw according to claim 1, wherein the part of the hub where the blades are mounted on the hub is conical or frustoconical in shape.

3. A screw according to claim 1, wherein the front ends of the blades extend in front of the end of the hub.

4. A screw according to claim 1, wherein the tubular housing is attached to the blades.

5. A screw according to claim 1, wherein the tubular housing is stationary and the blades rotate within the housing.

6. A screw according to claim 1, wherein the front side of the tubular housing is frustoconical in shape, a wide part of the housing being directed toward the front side.

7. A screw according to claim 1, wherein the cross-sectional area of the space through which the water is forced in use decreases between the front side of the blades and the rear side of the blades.

8. A screw according to claim 1, wherein the effective surface area of the blades increases continuously from the front side to the place where they are mounted on the hub.

9. A screw according to claim 1 wherein the screw is symmetrical, such that the front side and the rear side are identical in shape.

10. A ship according to claim 1, wherein the screw is a bow screw.

* * * * *